(12) United States Patent
Burt et al.

(10) Patent No.: US 6,253,077 B1
(45) Date of Patent: Jun. 26, 2001

(54) DOWNSTREAM POWER CONTROL IN POINT-TO-MULTIPOINT SYSTEMS

(75) Inventors: Donald G. Burt, Richardson; William K. Myers, McKinney; J. Leland Langston, Richardson; James Scott Marin, Murphy; Kevin B. Darbe, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/080,072

(22) Filed: May 15, 1998

Related U.S. Application Data (60) Provisional application No. 60/046,628, filed on May 16, 1997.

(51) Int. Cl.[7] .................................................. H04Q 7/20
(52) U.S. Cl. .......................... 455/424; 455/522; 455/67.1
(58) Field of Search ........................... 455/62, 67.1, 67.3, 455/522, 69, 422, 423–425, 127; 370/318, 335

(56) References Cited

U.S. PATENT DOCUMENTS

| | | | |
|---|---|---|---|
| 5,313,658 | * 5/1994 | Nakamura | 455/69 |
| 5,333,175 | * 7/1994 | Ariyavisitakul et al. | 455/423 |
| 5,345,598 | * 9/1994 | Dent | 455/522 |
| 5,485,486 | * 1/1996 | Gilhousen et al. | 370/335 |
| 5,491,837 | * 2/1996 | Haartsen | 455/62 |
| 5,631,921 | * 5/1997 | Schilling | 375/130 |
| 5,640,385 | * 6/1997 | Long et al. | 370/335 |
| 5,774,785 | * 6/1998 | Karlsson | 455/522 |
| 5,878,329 | * 3/1999 | Mallinckrodt | 455/69 |
| 5,884,187 | * 3/1999 | Ziv et al. | 455/522 |
| 5,893,036 | * 4/1999 | Trandai et al. | 455/522 |
| 5,933,781 | * 8/1999 | Willenegger et al. | 455/522 |
| 5,956,649 | * 9/1999 | Mitra et al. | 455/522 |
| 6,006,069 | * 12/1999 | Langston | 455/62 |

* cited by examiner

*Primary Examiner*—Nay Maung
(74) *Attorney, Agent, or Firm*—Robert L. Troike; Frederick J. Telecky, Jr.

(57) ABSTRACT

The invention provides methods and systems for power control in point-to-multipoint communications systems. Methods are described for downstream using an off-the-air monitor 31 and pick-up antenna 33. The monitor detects the power level of the pick-up signal and a control signal sets the transmittal output from the base station in proportion to the detected composite power level.

4 Claims, 8 Drawing Sheets

DOWNSTREAM POWER CONTROL IN POINT-TO-MULTIPOINT SYSTEMS

This application claims priority under 35 USC § 119(e)(1) of provisional application No. 60/046,628, filed May 16, 1997.

TECHNICAL FIELD OF THE INVENTION

This invention relates to point-to-multipoint systems and more particularly to downstream power control of these systems.

BACKGROUND OF THE INVENTION

Point-to-multipoint communication systems provide service to a large number of subscribers or remote stations from a central base station (or central base station) at each node. To maximize the number of subscribers serviced by the base station, the node may be sectorized into several sectors with a separate transceiver (transmitter and receiver) and antenna system for each sector. This provides for 100% frequency reuse on each sector. The polarization of transmitted and received signal may alternate about the node as disclosed in J. Leland Langston application Ser. No. 08/345,183, filed Nov. 28, 1994 entitled "Low Power, Short Range Point-to-Multipoint Communications System" incorporated herein by reference. This provides for 100% frequency reuse but creates sector to sector interference possibilities.

Previous 2-way point-to-multipoint systems include cellular telephony systems, wireless local loop systems, and satellite communication systems. Cellular telephone systems and wireless local loop systems incorporate a method of power control to minimize subscriber transmitted power. The power control system maintains each subscriber at threshold. In addition, both cellular telephone systems and wireless local loop systems do not re-use the same frequency at a base station. This does not eliminate the interference problems associated with systems like that in the Langston application that reuse frequencies at a base station to maximize capacity.

Other fixed wireless systems are known to use a measurement of signal to noise ratio to perform power control. The disadvantage of using signal to noise as a criteria for power control is that the power setting at the subscriber is performed on system interference as well as receiver noise. This is because the signal to noise measurement includes interference and actually measures signal to noise plus interference ratio. If subscriber power is increased when high interference is measured, the result is a further increase in interference.

The interference increase caused by increasing subscriber power may occur elsewhere in the system on a common frequency channel (frequency reuse between sectors and between nodes) and would be difficult to detect. It could further cause an increase in subscriber power elsewhere in the system resulting in or snowball effect, or system instability.

SUMMARY OF THE INVENTION

In accordance with one embodiment of the present invention a point-to-multipoint power control system is provided for one or more base station transmitters by an off-the-air monitor and pick up antenna located in a given coverage area of the base station for detecting power transmitted by the one or more base station transmitters. The system includes a generator for generating power level control signals based on the detected power level at the remote monitor and coupling these power control signal to the basestation to adjust the power levels from the one or more transmitters.

These and other features of the invention that will be apparent to those skilled in the art from the following detailed description of the invention, taken together with the accompanying drawings.

DESCRIPTION OF THE DRAWINGS

FIGS. 5($a$)–5($e$) are timing diagrams illustrating power control;

DESCRIPTION OF PREFERRED EMBODIMENTS OF THE PRESENT INVENTION

Figure 1:
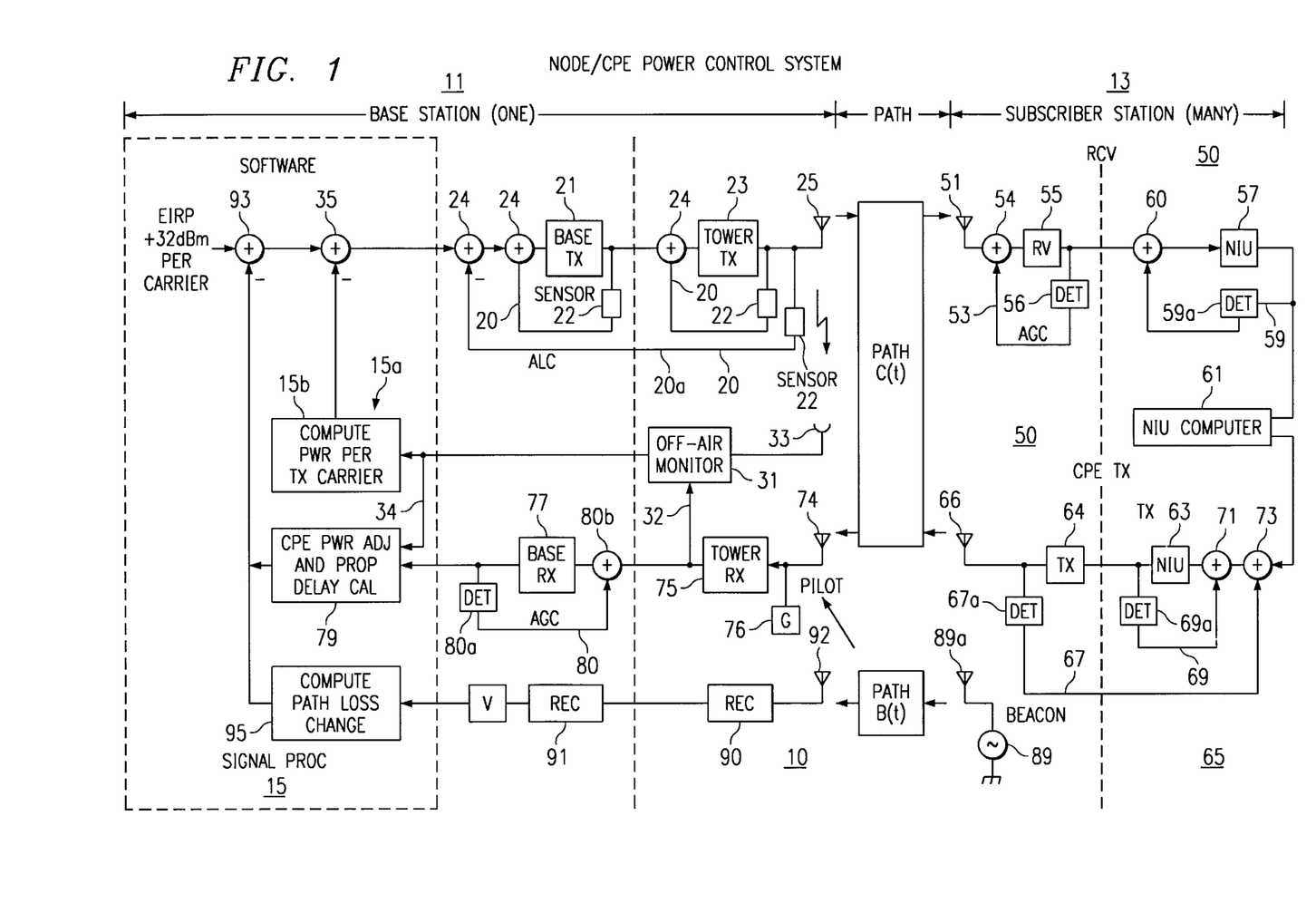
FIG. 1 illustrates an overall system according to one embodiment of the present invention.

Referring to the control system of FIG. 1, there is included automatic gain control loops (AGC), automatic level control loops (ALC), and control messages. The control loops can be continuous or at discrete time periods and be implemented in hardware or software.

A point-to-multipoint radio system has many subscribers (multipoints) that are controlled by a base station (point). The subscriber units are also referred to herein as customer premises equipment (CPE). Such a system has many sources of signal strength variation that must be controlled for proper system operation. This describes the overall power control problem and describes solutions or methods to deal with the problem.

FIG. 1 shows the overall system with the base station on the left side of the diagram and the subscriber station on the right side of the diagram. The propagation path is shown in the center of FIG. 1.

The problems that must be solved by the power control system are as follows:

1) Adjust for gain variation in all of the analog blocks (effected by component, temperature, aging).
2) Adjust for path loss variation (such as distance, rain fade, antenna misalignment).
3) Keep transmitted power from base station and subscriber stations to a minimum to meet operating licensing regulations (e.g. FCC) and minimize interference with other cells (nodes) and services.
4) Normalize the receive strength at the base station to minimize adjacent time slot, adjacent channel (frequency) interference, and adjacent sector interference.
5) For base stations that reuse operating frequencies between sectors, the power control method must minimize adjacent sectors interference.

6) For base stations in which the tower site is remotely located from the base site (where the receiver and computers are), the method should minimize the cabling between the tower site an base site.

7) Subscriber stations have extreme cost constraints and cabling between the roof unit (RU) and network interface unit must be minimized. The roof unit should be simple block up and down converters with a power setting control controlled in a network interface unit (NIU) computer.

8) The base station tower (RX) (receiver) is a bottle neck (all upstream signals pass through the tower receiver (RX)) that requires large dynamic range to prevent and errant subscriber station from overloading the upstream receiver and deadlocking the control algorithm.

9) The system must be stable on start-up (i.e. power on cold start) and reach steady state as quickly as possible (~<1 minute for a system with several thousand subscribers per base station).

Start-up here means a power-on event for the base station and all subscribers. The power control system must be stable in the presence of "Multipath " and several sources of interference. Multipath causes rapid fluctuations in received signal amplitude and phase. Interference can be from adjacent sectors, distance CPE from other cells, Backscatter, or insufficient transmitter to receiver isolation. Backscatter is caused when signals bounce back from such impairments like rain or snow.

10) The system must be stable during transient events such as might be caused by momentary loss of service from the base station or any subscriber stations and recover as quickly as possible (<1 MINUTE).

11) The system must be stable during steady state operation and must respond to time varying effects such as rain fade or component drift. During steady state the objective is that neither the subscriber or subscribers in adjacent time slots or channels (frequencies) should lose service (bit error rate specification exceeded).

The solutions to the problems stated above are described below in reference to system 10 of FIG. 1. The base station 11 is to the left and the remote or subscriber station 13 is to the right. The base station 11 includes a signal processor 15 including a computer 15a containing software for computing power per transmitter, CPE power adjustment, propagation delay calibration, and path loss change. The signal processor would also provide the signal intelligence to be transmitted to the remote subscriber station and control signals for the system. The output from the signal processor 15 is applied to the base station transmitter (TX) 21 and the output from the base station transmitter 21 to a tower transmitter 23. The Base transmitter 21 is the exciter with oscillator and modulator, etc. The Tower transmitter IX is the final power amplifier to the antenna 25. The tower transmitter (IX) 23 adds extra amplification and frequency translation at the antenna tower before being radiated by transmit antenna system 25. The separation of the base transmitter from the tower transmitter allows remotely locating the base transmitter equipment from the tower equipment. Equipment at the tower needs to be minimized in some cases and in some cases is totally tower mounted. The base equipment in today'ss technology takes several racks and is quite large. For point-to-multipoint systems in which subscriber states share a downstream carrier, i.e., demultiplex the time-divisions multiplexed data stream, the objective of downstream power control is to hold the power into the antenna (25) to a desired "set point. " The power into the antenna (25) should remain at the "set-point " as components and temperatures changes cause signal links in the base (24,21) and tower (24,23) to change. The signal processor (15) can change the "set-point " if necessary to overcome changes in the downstream path such as due to a large rain cell that is effecting most of the subscribers (13).

For point-to-point systems in which a subscriber station is at the dole user of the RF carrier, the objective is to minimize the downstream carrier power. Automatic level control loops (ALC) 20 are placed in the base station transmitter 21 to provide a stable, well-controlled transmit power (reference point). The ALC loop 20 may be at the tower (TX) 23, the Base station (IX) 21, or be a loop 20a around both the Tower (TX) and Base (TX) (as shown in FIG. 1). The ALC loop senses the power level at sensor 22 to control the gain level at gain control points 24 which may be an amplifier or attenuator. The sensor (22) may be a simple total power (forward and reflected) detector; however, if variations in the standing wave ratio (SWR) are expected a directional coupler that senses forward power may be necessary at sensor 22. The SWR may vary due to backscatter, ice build-up on the antenna/polarizer/radome, moisture in the waveguide or other anomalies. In one embodiment, the transmit power level is provisioned to a set point (e.g. +32 dBm). At no time should the tower transmit power be out of control. The radio license will require that the transmit power be under control and within the license limits at all times. The term "under control " means that the actual transmitter power is within a few tenths of a dBm of the desired "set-point". The tower transmit power may need to be adjusted to compensate for path loss (such as due to rain fade) but potential adjacent sector and adjacent cell effects must be considered when making any transmit power adjustments. By keeping the tower transmit power under control at all times, potential deadlocks or instabilities in other parts of the control system have a chance of being broken and controlled. A deadlock might occur when a subscriber or CPE is allowed to autonomously increase their transmitter power even if downstream control messages from the node has been lost. Instability could occur when CPE transmission from another can not be distinguished from the desired CPE. The software 15 could instruct the desired CPE to increase power too much causing noise (interference) floor to raise in the adjacent frequency channels.

As shown in FIG. 1, an off-the-air monitor 31 including a pick-up antenna 33 is employed to monitor the tower transmit power radiated from base station antenna system 25. The monitor 31 may look at the tower composite power or the power of any individual channel transmitted by the transmitter 23. A subscriber station (CPE) or a spectrum analyzer may be used as the monitor but the path (c(t)) should not influence the signal received by the monitor 31. The monitor 31 helps insure that the tower transmit power is under control at all times. The use of a monitor 31 can allow elimination of one or more of the ALC loops 20 discussed in above (Base (TX), Tower (TX), or both). The sensed level at monitor 31 is used to compute the composite power and/or power per channel at computer 15a in the signal processor 15 and this computed level sets the attenuator or amplifier level at control 35.

At the subscriber station 13 roof unit 50 an automatic gain control (AGC) loop 53 is used primarily to adjust for path loss differences between near and far stations and rain fade. For example, a current system has a range of from 0.1 to 5 km which cause a 20 log(5/0.1)=34 dB difference in signal link between near and far CPEs. The subscriber station 13 includes a receive antenna 51 coupled to a receiver unit (RU)

55 coupled to a Network Interface Unit (NIU) 57. As an example, a station at close range (1 km base to subscriber) receives a large signal and the receiver unit (RU) 55 should not amplify very much. For stations at the outer edge of the cell the path loss is large and the receiver unit (RU) 55 must compensate by having a large gain.

The AGC loop 53 in the receiver unit (RU) 55 should present a nearly constant signal level to the network interface unit (NIU) 57. As a rain cloud moves through the path, the path loss changes and the receiver unit (RU) 55 AGC 53 must compensate. The increased loss, detected at detector 56 is coupled to the variable gain control (amplifier or attenuator) 54 to increase the gain level to the receiver unit (RU) 55 and to the NIU 57. The NIU 57 demodulates the RF signals and converts the signals to telephony protocols such as DS1. The NIU can also distribute an RF signal for TV applications.

The NIU 57 may use an AGC loop 59 which is probably built in to the tuner/demodulator. The AGC loop 59 in the tuner/demodulator assures that the actual demodulator circuitry has a good signal level to demodulate. The loop 59 would include a level detector 59a at output end and gain control (amplifier) 60 at the input end.

An NIU computer 61 receives a message stream sent from the base station signal processor 15. The message is addressable to individual subscriber stations to speed-up convergence during power-on or transient recovery. A broadcast message may be sent from the base station 11 in which all subscriber stations 13 respond. A principle message is the value for the subscriber station transmit power. Two other messages are "increment" and "disincrement" subscribers station transmit power. A third option is for the subscriber station NIU computer 61 to execute some sort of search algorithm such as a binary or Fibonnouis search. For this option to work, the NIU computer 61 needs to receive an indication of the receive signal strength or signal-to-noise ratio as received at the base station 11 from the CPE 13. This concept distributes the control loop computations to the subscribers station processors and may ease the computation on the base station processors 15. The base station'ss job, in this scenario, is simply to communicate the receive signal strength indication (RSSI) level and/or signal to noise ratio back to all subscribers stations that are enrolled in the cell. There may be issues with deadlocks, interference, and overloads if subscriber stations transmit much power (such as could happen with a binary search) but this approach (NIU computes upstream power control) may be optimum in terms of minimizing the time to reach steady state. To 1) keep the CPE power to a minimum and 2) distinguish between desired and interference signals, and 3) maintain algorithm stability an RSSI, a signal-to-noise ratio, and bit error ratio estimates may be necessary. Signal-to-noise ratio in a digitally modulated system is often referred to a $E_b/N_o$ which is the energy per bit ($E_b$) divided by the noise-power-spectral density ($N_o$). Note that the No term also includes interference.

The transmit chain 65 at the customer premises equipment (CPE) 13 (also called the remote subscriber station 50) may have ALC loops 67 and 69 in the transmit NIU 63, subscriber transmitter (TX) 64, or both. The feedback path (67)shown in FIG. 1 from the CPE (TX) RU to the NIU is undesirable because of the cabling cost. The detected level at the output of the transmit NIU 63 is detected by a detector 69a and utilized to adjust the gain at gain control 71. The detected level out of transmitter 64 to transmit antenna 66 at 67a is used to adjust the gain or level at control 73. The objective of the control loops 69 and 67 is to maintain the power into the antenna (66) to a set point determined by the algorithm in processor 15 in base station 11. The objective of the algorithm in processor 15 in base station 11 is to set the antenna power 66 to a value such that the receive signal level (RSL) at the base station node receiver (75) is within a few tenths of a dB of a desired set point. If the NIU algorithm in NIU 61 is allowed to autonomously increment, decrement or calculate the CPE TX power setpoint, care must be taken to prevent deadlocks and instabilities. In general, the algorithm in processor 15 must maintain direct or indirect control of the CPE transmitter power "set-point".

The base station tower receiver 75 may or may not have an AGC loop. The base station receive antenna 74 picks up the CPE transmitter 64 signal and applies that to the tower receiver 75. The tower receiver 75 is a bottle neck for all signals from subscriber stations. The tower receiver is located at the antenna'ss site. The base receiver may be located away from the tower. An AGC in the tower receiver might normally function using total power from all subscribers. If any subscriber dominated the power then weaker subscribers could lose service, which is highly undesirable. The best approach is to make the tower receiver 75 have as large of a dynamic range as possible and no AGC loop but the transmitter path between the tower receiver (RX) 75 and the base receiver (RX) 77 may have very limited dynamic range and widely different gains from installation to installation. For example, an analog fiber optic system may only have a window of a few decibels (dB). To be in the window, some sort of AGC at the tower receiver (RX) 75 is required. In accordance with one embodiment off-the-air monitor equipment 31 (e.g. Frequency (channel) selective spectrum analyzer) can be time division multiplexed to monitor the tower receiver (RX) 75 output (arrow 32). The output of the analyzer 31 (which could also be implemented by placing a down converter demodulator assembly at the tower site) is sent (arrow 34) to the base station signal processor 15 where CPE power adjustment & propagation delay calibration software 79 computes the power adjustment and propagation delay calibration. Corrections are calculated and control messages are generated to the CPE program in computer 61, the tower receiver (75) and/or base receiver (77).

The base station base receiver (RX) 77 does channel selection and demodulation of the upstream signal. FIG. 1 shows an AGC loop 80 in the base receiver (RX) 77. This loop 80 with detector 80a and gain control 80b functions similarly to the loop 59 in the NIU downstream path. The base receiver (RX) 77 consists of a tuner and demodulator function. The AGC loop 80 at the base station receiver (RX) 77 allows the demodulator to have a nearly constant input over widely different signal strengths at the impact to the base station receiver (RX) 77. The objective of the CPE power adjustment calculation is to estimate the $E_b/N_o$ at the input to the demodulator in base receiver 77 and the RSL at the tower RX front end 75.

The beacon system is shown in the lower right of FIG. 1. In one embodiment, the system uses a beacon signal source 89 and antenna 89a radiator radiating a beacon signal of known strength. With a time varying path (B(t)), the tower receiver (RX) 75 or an addition tower receiver (RX) 90 can be used to measure one-way path loss. Standard subscribers stations 13 may also be useable as beacons or perform the dual role as a beacon.

At the base station 11 the beacon concept can use the same tower receiver (RX) 75 and base station receiver (RX) 77 equipment as the upstream from subscribers station or the separate path of receivers 90 and 91. In FIG. 1, the separate beacon path shows no AGC loops at the tower receiver 90 or at base station receiver 91 in order to get a pure estimate of B(t); however, temperature dependent component variation and the constraint to match a narrow dynamic range window between the tower receiver 90 and base station receiver 91 mean a loop control may be necessary around 91 and 90.

The processor 15 in FIG. 1 includes a the following:

a) A tower transmitter (TX) set point control 93 (e.g. +32 dBm).

b) A "compute PVVR per transmitter(TX) carrier" program 15b in the computer 15a that assures that the tower (TWR) transmitter (TX) power is under control via level control 35 (attenuator). This function may not be necessary if the ALC loops 20 in the base transmitter 21 and tower transmitter 23 (TX), keep the tower (TX) 23 power under control.

c) A "CPE Power ADJ and Propagation Calibration " program 79 in the processor computer 15a which determines a desired power for each CPE (subscriber) and sends a message to each CPE about what change (if any) should be made the next time the CPE transmits. As mentioned above, it may be better for the NIU computer 61 to do the calculation in which case the software at the base station simply provides the RSSI value and the station 11 transmits receive signal strength indicator (RSSI) and/or $E_b/N_o$ value to the subscriber station 13. The propagation delay calculation is necessary to align time slots between subscribers stations that are transmitting on the same channel. Each subscriber station 50 has a register that advances or retards its transmit time depending on distance (time delay).

d) The compute path loss change program device 95 in computer 15a estimates the path loss. Once an estimate of path loss is available, then the tower receiver (RX) power and/or subscribers station can be adjusted to compensate.

As part of the message stream from the base station to subscriber station, a "PING " request may be issued. The ping could return a receive signal strength indicator (RSSI) and/or $E_b/N_o$ that the NIU 57 detects. With AGC in the receiver 55 and NIU 57 it may be difficult to calculate an RSSI at the subscriber station. "PING " can verify that a subscriber is functioning and can also estimate the downstream path loss (c(t)). The NIU power algorithm could be a function of RSSI (Downstream) but must watch out for stability problems.

Continuous Mode Power Control Algorithm

Power control for the return link is necessary for systems fielded with multiple 2-way CPE units 13. It is required to provide near/far compensation of received power to avoid adjacent channel interference and to control the received level of all signals to minimize intermodulation distortion in the receiver components.

Return Link Power Control Design

The objectives of the return (inbound or upstream) link power control are as follows:

Minimize adjacent channel interference (ACI) by minimizing the difference between signal levels of adjacent channels at the demodulator.

Equalize the RF signal level for all CPEs at the receiver input and limit the maximum received signal level. This is required to control composite intermodulation distortion (CIMD) at the tower receiver, the fiber optic link and other multi-channel receiving components while maintaining adequate channel signal-to-noise ratio.

Maintain adequate signal level in rain conditions to the extent permitted by the available power.

Limit transmit clear air power to the required FCC limits. (This limits the potential interference with other services such as satellite services as discussed previously.)

Provide adequate dynamic range for rain conditions and receiver variations.

To achieve the above objectives the following design is provided.

Figure 3:
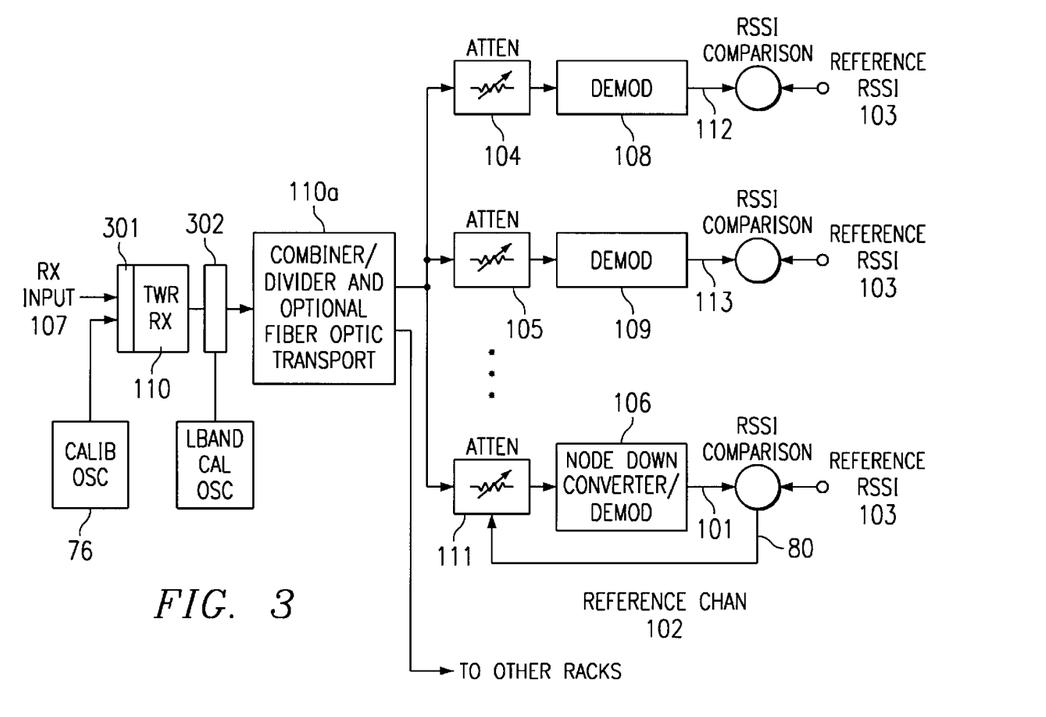
FIG. 3 is a block diagram of receiver calibration.

In one embodiment, a calibration source 76 tone of known amplitude shall be injected at the tower receiver 77 (FIG. 1) input to calibrate the receiver gain in blocks 75 and 77 at the demodulator received signal strength indicator (RSSI). Referring to FIG. 3, there is a simplified version of the upstream path through node ba se receiver 75, and base receiver 77 in FIG. 1. "Pilot " and "Calibration " tone are used interchangeably throughout this patent application. This calibration (pilot) signal can be at the band edge at a level of, for example, −80 dBm. One node downconverter/demodulator assembly (NDDA) 106 located in receiver 77, FIG. 1, or one per rack, will be used as a reference channel for detection. The pilot signal will be detected at the reference channel NDDA RSSI output FIG. 3, 101 and compared to a reference RSSI level in algorithm 79, FIG. 1. The reference level 103 (FIG. 3) will be set such that the NDDA detection is approximately 14 dB above the lower operating limit of the reference channel demodulator 106. The lower operating limit is the sensitivity level of the demodulator which is the $E_b/N_o$ produces the desired BER of for example $10^{-6}$.

Each RF channel NDDA attenuator (104, 105, and 111 in FIG. 3) shall be adjusted to equalize the channel gain from the tower (TWR) receiver RX input (FIG. 3, item 107) to the input to the demodulators (FIG. 3, items 106, 108, 109). The desired operating point provides adequate detection at the target received signal level and when signals are at the minimum threshold (no interference continuous mode) of approximately −95 dBm at receiver input. (FIG. 3, 107) The reference pilot channel demodulator (FIG. 3, 106) will be tuned to each active RF channel in a cyclic fashion to compare RSSI of the active channel to the pilot RSSI. Active channel attenuators (FIG. 3, 104, 105) will be adjusted to the corrected calibration reference and CPE power will be controlled by each active channel. This algorithm which is computed by computer 15 in FIG. 1 should provide equal received power for all CPEs at the input 107 of the tower (TWR) receiver (FIG. 3, 110).

Frequency response (gain from TWR receiver FIG. 3, 107 to the demodulators FIG. 3, 108, 109) across the receive band needs to be characterized or calibrated and controlled to reduce errors in the power control loop.

Control of each CPE transmitter power s hall be provided over the downstream control channel to obtain the clear target level at the tower receiver. (FIG. 3, 107) The target level shall be approximately −82 dBm (6 dB above the worst case threshold). This value must account for the power control accuracy and provide performance better than the threshold condition.

The software 15b in computer 15a of FIG. 1, may instruct a CPE to increase or decrease power output at FIG. 1, item 66 to maintain the target receiver input level (FIG. 3, 107) until rain exceeds the available margin. When heavy rain is experienced, the CPE may not be able to transmit enough power to overcome the path loss. In this case the signals received at the node receiver (FIG. 3, 107) will fall below the detection threshold and excessive bit errors will occur at the output of the demodulators. (FIG. 3, items 108, 109).

The dynamic range of each component in the sign alpha shall be at least 23 dB which is calculated as the target received level (−82 dBm) minus the best threshold level (−95 dBm) plus pilot level accuracy (2 dB) plus power control accuracy (2 dB) plus gain/frequency response variation (approximately 6 dB) accumulated from the receiver input (FIG. 3, 107) through to the in put t o the demodulators (FIG. 3, item 108, 109). The gain and frequency tolerances for the demodulator RSSI and other dividers and amplifiers in the receive chain are suggested in Table 1. Table 1 is for CPE transmitter power, not node/base receiver chain. The dynamic range must include the appropriate multi-channel density (i.e., after the demodulator SAW filter one channel is present and prior to that the density is that of the quadrant).

Software (FIG. 1, item 15b) is required to provide calibration and power control using the digital RSSI outputs (FIG. 3, 112, 113) and the downstream (outbound) link control channel. It is also necessary to provide clear weather CPE power output control limits. This will be based on the target received level and knowledge of the CPE maximum range

ANALYSIS

Figure 2:
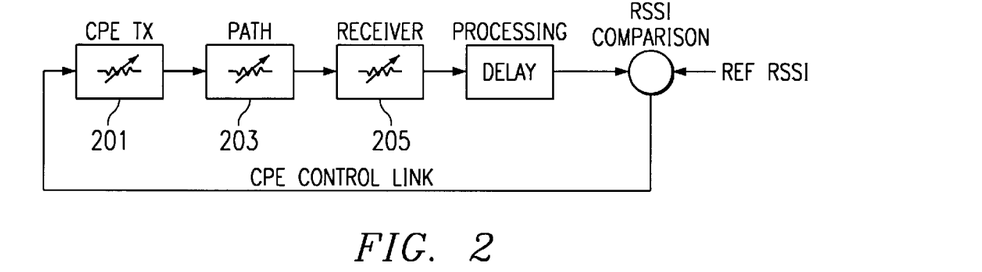
FIG. 2 illustrates power control model variables.

FIG. 2 shows the return link including the CPE transmitter gain control 201 the propagation path including antennas 203, and the receiver gains 205. The software (FIG. 1, 15a) must estimate these values for a CPE location based on distance from the node radio port, rain conditions and equipment gain variation.

The CPE distance from the node radio port is not automatically known and must be estimated by software (FIG. 1, item 15a). If the level into the receiver (FIG. 2, 205) is measured and the CPE is not beyond a predefined range, the CPE transmitter (TX) power FIG. 1, at antenna 66 can be calculated such that maximum permitted clear air power output at FIG. 1, antenna 66 is not exceeded.

To provide equal signal levels from all CPE subscriber transmitters 50 (FIG. 1) at the receiver (FIG. 1, 75) input, the receiver gain must be accurately determined. This may be accomplished with a low level pilot signal generated at generator 76 injected into the 28 GHz receiver input at coupler 301 at an unused frequency (at bandedge). As an alternative, a lower cost L-Band calibration tone (77) could be used. The use of its L-Band calibration tone makes estimation of the gain of the receiver (75) somewhat uncertain. The L-Band calibration tone and associated coupler 302 also eliminates the 28 GHz coupler 301 (FIG. 3) which slightly degrades the noise figure of the receiver. L-Band calibration tones are much less costly than KaBand calibration tone oscillators. Out of band noise was considered but would not provide the accuracy required. The pilot could be coupled into the antenna or prior to the LNA 110 as shown in FIG. 3. Any variation in level at the receiver input adds to power control error. The pilot level must be very stable (temperature compensated) to provide an accurate reference for the receiving system. The demodulator RSSI will be used for receiver gain control. therefore the pilot phase noise and frequency accuracy are not critical. FIG. 3 shows the calibration model. The pilot signal is separated by channel and the demodulator signal is compared to the references RSSI for that channel. The intermediate frequency (IF) out of the tower receiver (FIG. 3, 110) for the pilot calibration tone is, for example, 1950 MHz.

Target Receive Signal Level (FIG. 3, item 107)

It is desired in clear air nominal conditions to operate above receiver threshold, be error free, and to accommodate power control accuracy. Power control accuracy means that the actual value of RSSI at FIG. 3, at point 107 is within approximately +2 dB of the desired set point The power control algorithm (FIG. 1, 15a) should set the desired set point for node receiver signal strength (FIG. 3, 107) between −88 and −82 dBm. (−88 dBm, receiver sensitivity for $10^{-6}$ BER, +6 dB, margin, =−82 dBm) It is desired to maintain a power control accuracy of +/−2 dB or better. A value of 6 dB above worst case threshold would be −82 dBm. Worst case threshold is based on the burst mode forward error correction (FEC), with 40 KHz frequency error and with interference degradation of 3 dB to the burst mode best case threshold of −91 dBm. For best case threshold with continuous mode FEC, no frequency offset and no interference the threshold is projected to be −95 dBm.

The target level must include margin for power control tolerance.

Range of Power Control at the CPE Transmitter Output (FIG. 1, CPE TX 64).

Power control must accommodate both near/far path difference and rain path difference. The near/far is based on the System Specification requirement of 0.1 Km to 5 Km range as follows.

$$\Delta P = 20 * \text{LOG}\left(\frac{5}{0.1}\right)$$
$$= 34 \text{ dB}$$

Table 2 shows the amount of CPE TX transmitter power dynamic range required of 79 dB worst case and 20 dB min if all fixed variation is removed during set up.

Intermodulation Distortion

Composite intermodulation distortion is a major concern when many signals are present simultaneously in a system. This is the case at the tower receiver, fiber optic link, power divider/amplifiers and the demodulator front end.

A symmetric band plan provides 480 MHz of return link bandwidth and an asymmetric band plan provides 120 MHz bandwidth. When the 4 quadrants of the asymmetric band plan are combined, the bandwidth is again 480 MHz. The 2.5 MHz wide RF channel with 480 MHz total bandwidth would result in 192 RF channels. These channels could be received by the quadrant tower receiver and relayed to the base by fiber optic lines.

The composite intermodulation distortion (CIMD) allocated to the receiver is for example −30 dBc. Each component of the receiver chain should be better than this to obtain a total of −30 dBc. The CIMD is greatest at the target received signal level of −82 dBm plus power control error tolerance. CIMD is set by the level into each component and the associated third order intercept. At threshold (low signal levels), the component SNR would be the predominant degradation factor. When distortion is limited, the optimal operating point of a component of the receive system is when the CIMD at maximum level is equal to the SNR at the minimum level. A −30 dBc CIMD and SNR becomes difficult to achieve for a 20 Km fiber optic link.

Each receiver chain component shall have a dynamic range to provide the CIMD discussed in E over the RF input operating range.

| | |
|---|---|
| Target receive power to threshold | 13 dB |
| Power control accuracy (+2 dB est) | 4 dB |
| Preceding component tolerance | Y |
| Total dynamic range | 17 + Y dB |

Each successive component will encounter a level variation equal to the cumulative gain tolerance of the preceding stages (designated Y in the above). The third order intercept may be used to calculate the 2-tone and 3-tone IM and multi-tone composite IM.

Continuous Mode Upstream Power Control Algorithm

Figure 4:
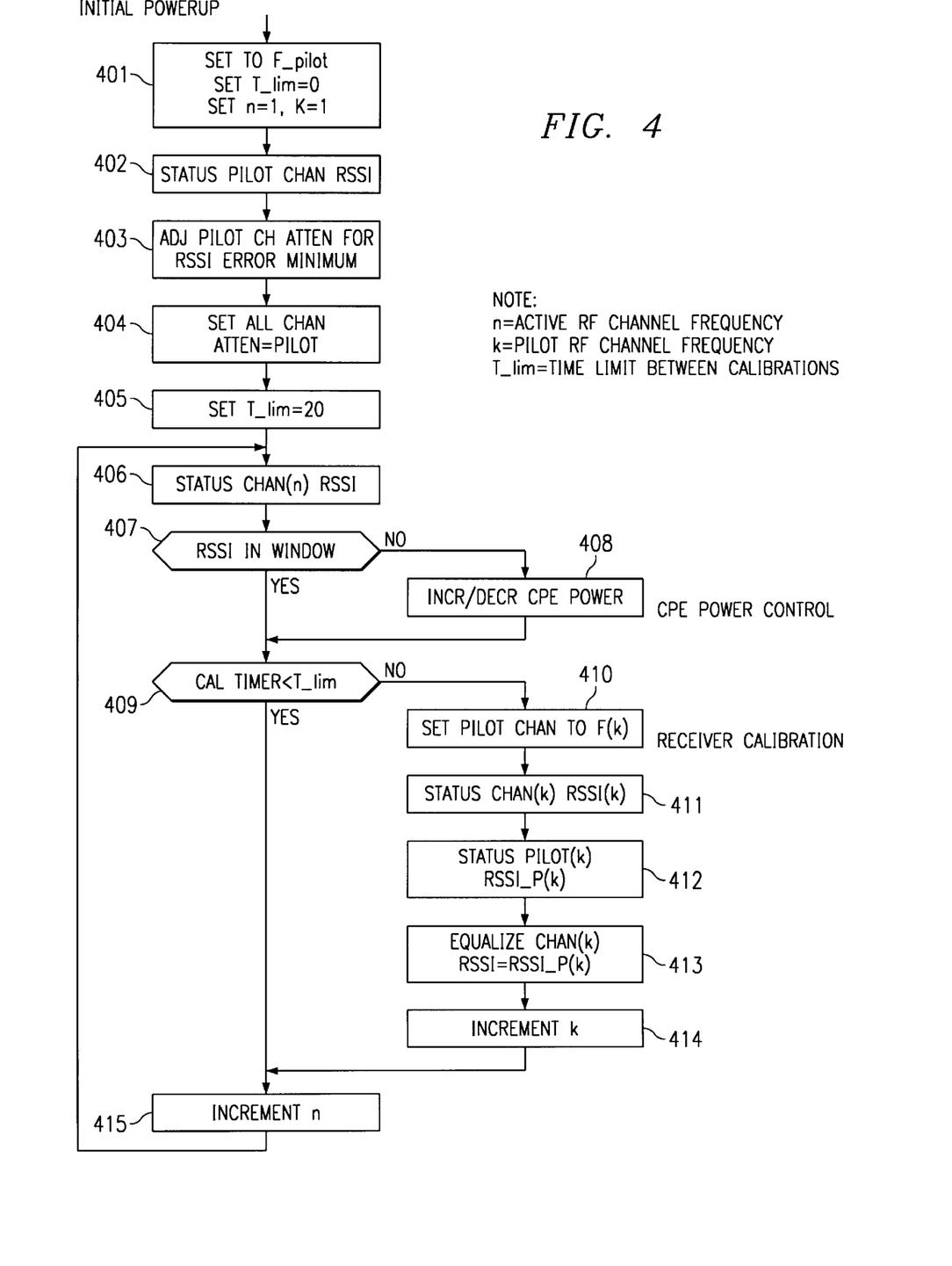
FIG. 4 is a flow chart of the high level power control algorithm.

The preliminary software control program FIG. 1, 79 is presented in FIG. 4. The receiver calibration and power control loop are included.

Receiver calibration is on a very slow time constant to account for temperature changes in the tower, fiber optic and network components. It is suggested that a maximum limit (T_LIM) of 30 minutes between calibrations.

The continuous mode power control loop algorithm (FIG. 3) functions as follows:

Step 401, the pilot generator is turned on to the pilot frequency (F_pilot) and the calibration time limit (T_lim) are initialized to zero seconds.

Step 402, the RSSI of its pilot channel (FIG. 3, 101) is read by the control software (FIG. 1, 15a).

Step 403, the pilot attenuator (FIG. 3, item 111) is adjusted until the RSSI reading (FIG. 3, item 101) equals the references RSSI level (FIG. 3, item 103).

Step 404, the channel attenuators (FIG. 3, items 104 and 105) are set to the same value as the pilot attenuator (FIG. 3, item 111).

Step 405, the calibration time limit (T_lim) is set to a value such as 20 seconds.

Step 406, the RSSI of channel n (FIG. 3, items 112, 113) is read.

Step 407, the RSSI readings from step 6 are compared to the reference RSSI level (FIG. 3, item 3)

If the RSSI is outside the power control loop window, then in Step 408, the CPE for the channel is instructed to increment or decrement its transmit power (FIG. 1, item 64).

Step 409, the calibration timer (Cal_timer) is compared to the calibration time limit (T_lim) which was set to 20 minutes in step 5.

Figure 6:
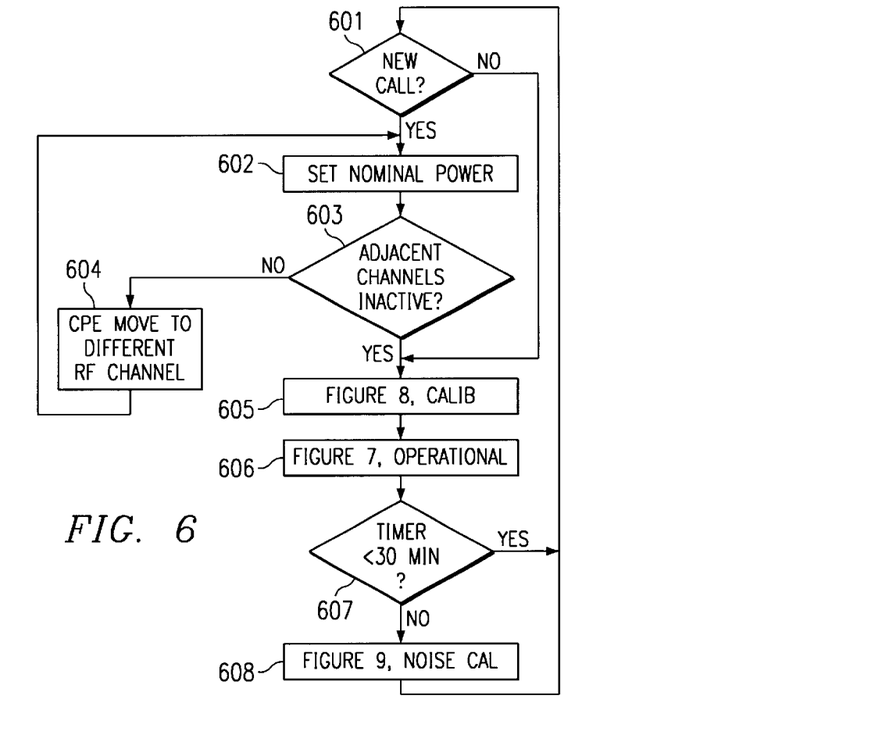
FIG. 6 is a flow chart of the primary loop, burst mode.

If calibration should occur, then Step 410 through 414 calibrate each receive channel. The key step is to equalize the channel in Step 413 by adjusting the channel attenuator (FIG. 6, 104, 105)

Step 415, the points, n, to the RF channel is incremented and control is passed back to Step 406.

Figure 5A:
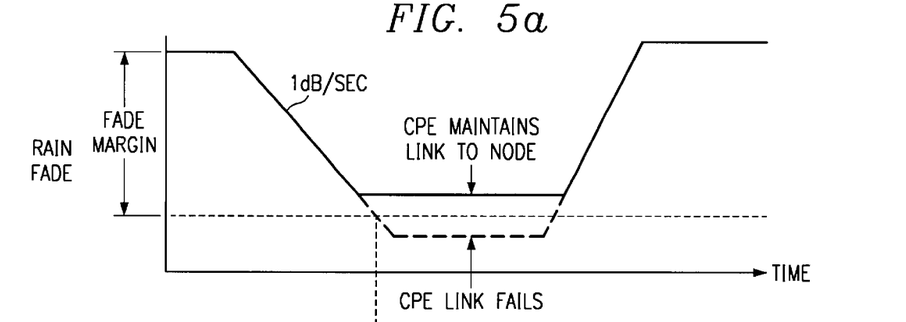
Figure 5B:
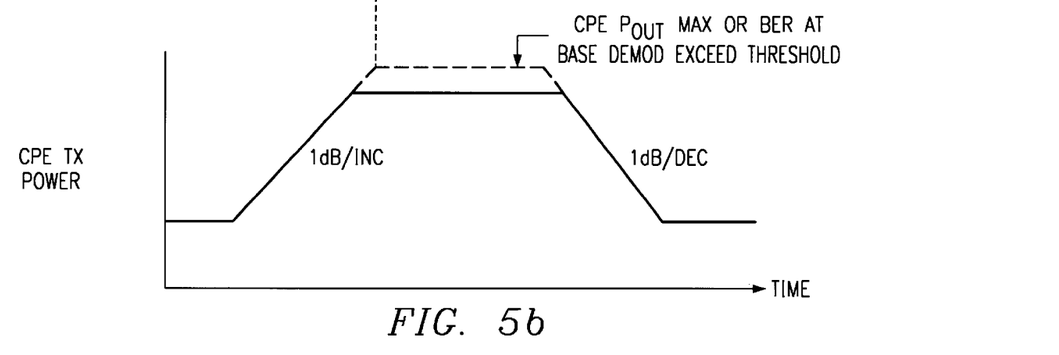
Figure 5C:
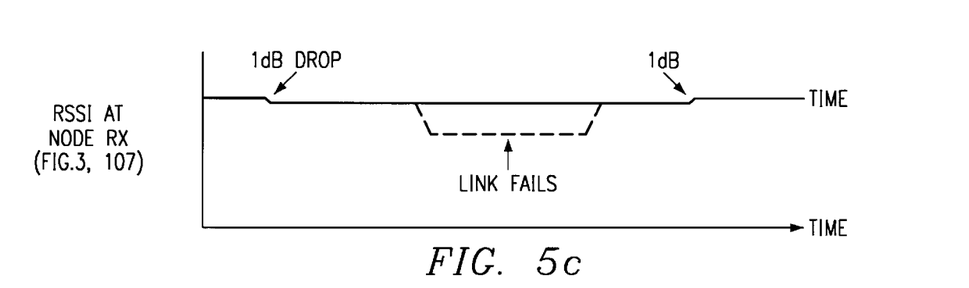
Figure 5D:
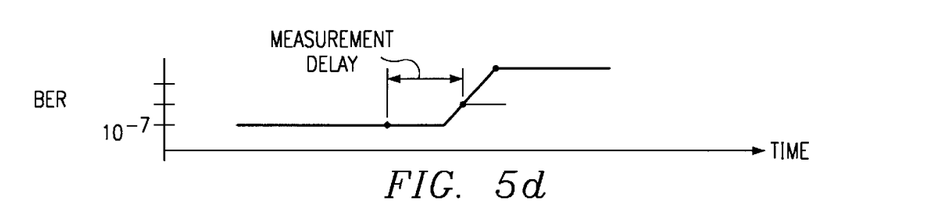
Figure 5E:
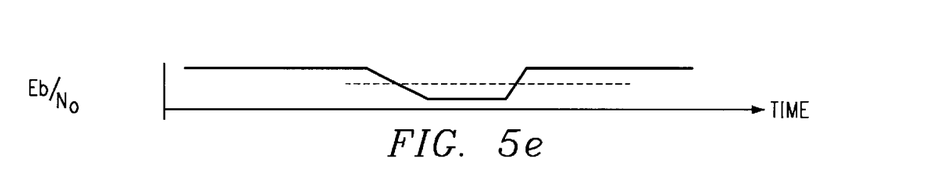

CPE transmitter power (FIG. 1, item 64) control must be changed in small increments to retain channel to channel balance and prevent bit errors due to power changes. The CPE design currently has 1 dB resolution in the attenuators. (See FIG. 5a) FIG. 5a assumes that the CPE TX power is only incremented or decremented in 1 dB steps. The maximum rate of change due to a rain cell passing through the pathway 1 dB/second. This is based on a 3 Km diameter rain cell moving at 20 mph and occurs as the cell initially crosses the propagation path. If the fade exceeds the fade margin the CPE link fails. Insufficient information has been found in published literature to estimate the fade rate for short path atmospheric multi-path although it would occur very rarely. The CPE transmitter (TX) Power set point for all CPEs needs to be calculated at least once per second to insure the service is maintained as rain cells move in and out of the transmission path. The CPE transmitter (TX) power setting can be commanded to a specific setting, which would allow a slower update rate. FIG. 5(b) illustrates the transmitter power output increases or increments as the fade increases and decrements at the fade lessens.

Option: If sufficient processing speed is available in software (FIG. 1, 15a) to visit each active RF channel for other reasons such as detection of alarms or equipment failure and also visit the reference channel 1/second, another method would be possible. The reference channel demodulator (FIG. 3, demodulator 106) could be tuned to each active telephony RF channel, read the RSSI of the active channel and perform power control solely from the reference channel. The pilot would need to be visited on the reference channel less frequently. If the NDDA tuning speed is fast enough, there may be a processing tradeoff that assigns a separate resource to power control on the reference channel.

Error Analysis

Error contributors are shown in Table 1. Additional data is needed on the NDDA and other components to determine expected performance. It may be desirable to increase resolution to the power control attenuator and LSBs.

TABLE 1

Tolerances that Contribute to the CPE TX Power Setpoint Range

| PARAMETER | TOLERANCE +/− dB |
|---|---|
| Power control attenuator step size | 1 |
| Pilot level | 1 |
| Uncalibrated frequency response | ? |
| RSSI accuracy | ? |
| TOTAL | 2+ |

Burst Mode Upstream Power Control Algorithm

In the burst mode this CPE transmitter is turned on, sends a burst of data, and then turns off.

The CPE power control will be provided to keep the received signal for each CPE on any timeslot or RF channel within 4 dB. For the burst demodulator at the node, the following signals are available to use for CPE power control.

1. RSSI—received signal strength
2. QI—signal quality indicator
3. QI—th-signal quality indicator threshold RSSI must be calibrated against demodulator threshold using the Ql signal. This is done when a new caller is brought on and is required to account for receiver gain variation with temperature. It may be also on a timer. RSSI is an indication of signal level which is a function of receiver gain, CPE transmit power and path characteristics. QI is an indicator of how good the signal to noise plus interference is and may be obtained by measuring the detector "eye " opening. Due to cross polarization and adjacent channel interference, this indication may only be valid for signals 3 or 4 dB above threshold. QI_th is the threshold value of QI which needs to be embedded in the demodulator. See FIG. 6.

From Step 601, if a new call, go to step 602 (Set Nominal Power), otherwise skip to Step 605. In Step 602, the CPE transmits an initial burst using an expected nominal or default power. In Step 603, the bit-error-rate or $E_b/N_o$ measurement is made on the adjacent channels to see if the burst from Step 602 caused interference. If the adjacent channels are not inactive (due to Step 602), move the CPE to another RF channel (Step 604).

Figure 8:
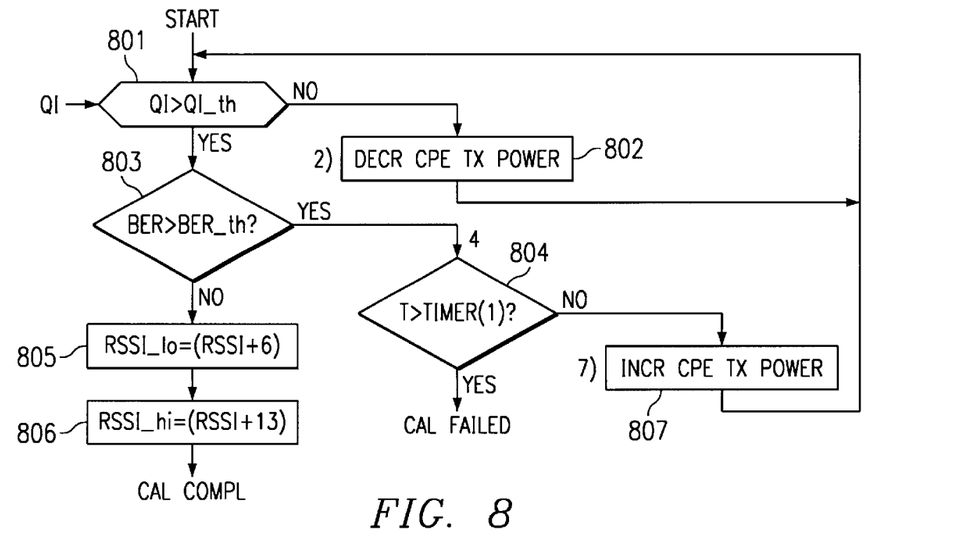
FIG. 8 is a flow diagram of the RSSI calibration.

Step 605 is explained in FIG. 8.

Figure 7:
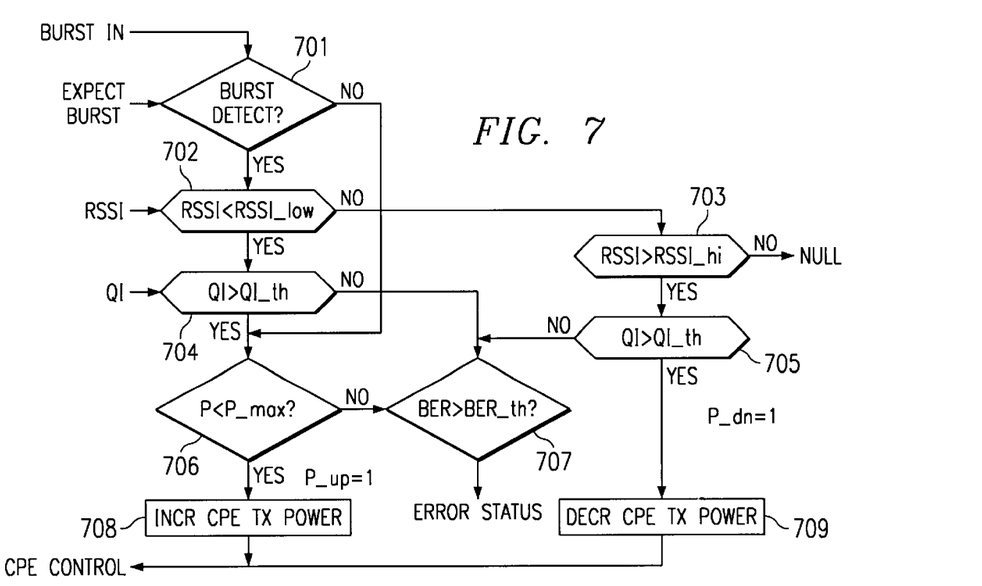
FIG. 7 is a flow diagram of the operational time slot.

Step 606 is explained in FIG. 7.

Step 607 checks a timer to see if calibration is required (Step 608).

RSSI values are set to provide upper and lower limits to maintain an acceptable received operating level. See FIG. 7. For Step 606 see FIG. 7 and the following steps:

In FIG. 7, Step 701, if no burst during the time defined by "Expect Burst", then go to Step 706, otherwise go to step 702.

In FIG. 7, Step 702, if the RSSI is greater than, the RSSI_lo threshold (i.e., normal operation requiring no CPE TX Power Adjustment) then go to Step 703, otherwise go to Step 704.

In Step 703, if RSSI is less than RSSI_hi, then no CPX TX Power Adjustment is required, i.e., "NULL".

RSSI measured for each active CPE timeslot and is used to determine if the CPE power needs to be adjusted.

In Step 704, if the quality indicator QI is greater than threshold then go to Step 706; otherwise, go the Step 707.

In Step 705, if the QI is above the QI threshold, then go the Step 709 to decrement CPE TX Power.

In Step 706, if the CPE TX Power is less than P_MAX then go to Step 708 to increment CPE TX Power; otherwise, go to Step 707 to check the bit error ratio.

In Step 708, the command is sent to the CPE to increase TX Power.

In Step 709, the command is given to the CPE to decrease TX Power.

In FIG. 8, the CPE transmitter TX Power is adjusted (Step 802, or 807) until the QI is above threshold (Step 801), the BER is below threshold Step 803, and the window (RSSI_lo, RSSI_hi) are set (Step 805 and 806).

In Step 801, the algorithm waits for a time slot without a signal (i.e., no burst).

In Step 802, an adjustment (ADJ) is calculated based on the calibration channel on the difference in RSSI reading between the n and the calibration channel (1).

In Step 805, the RSSI_lo threshold for channel n is set to include the adjustment from Step 802.

In Step 806, the RSSI_hi threshold for channel n is set to include the adjustment from Step 802.

Figure 9:
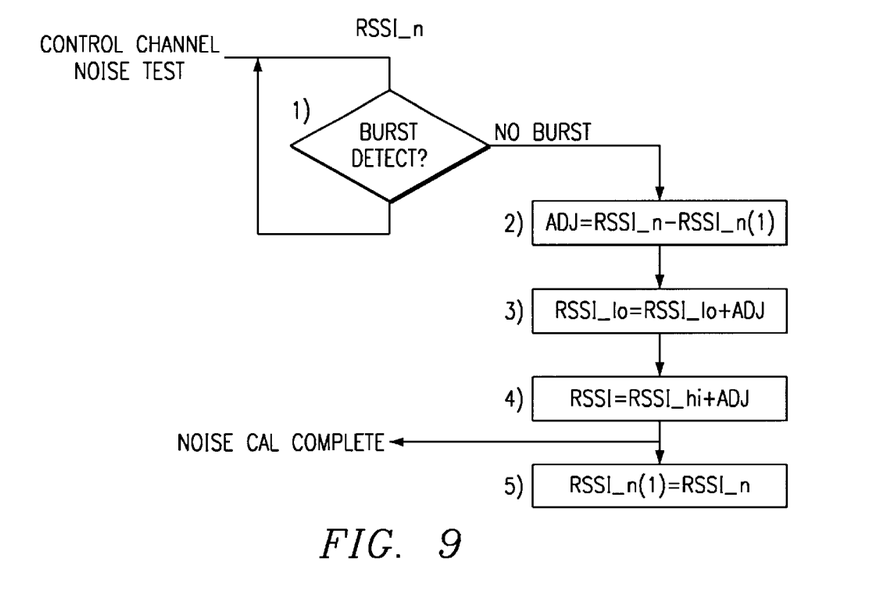
FIG. 9 is a flow diagram of the noise calibration.

Receiver noise level is measured in the control channel when it is inactive to determine if the receiver gain has changed over a specified time interval when no new calls are being processed. RSSl limits are adjusted accordingly. See process in FIG. 9.

A CPE power change is made when measured RSSI goes outside the upper or lower limit values.

The system must keep track of each CPE maximum allowed power so that power can not be increased to the CPE capability limit and cause increased interference. That would cause the algorithm to calibrate on interference in place of signal.

A Low Cost Implementation Example

Figure 10A:
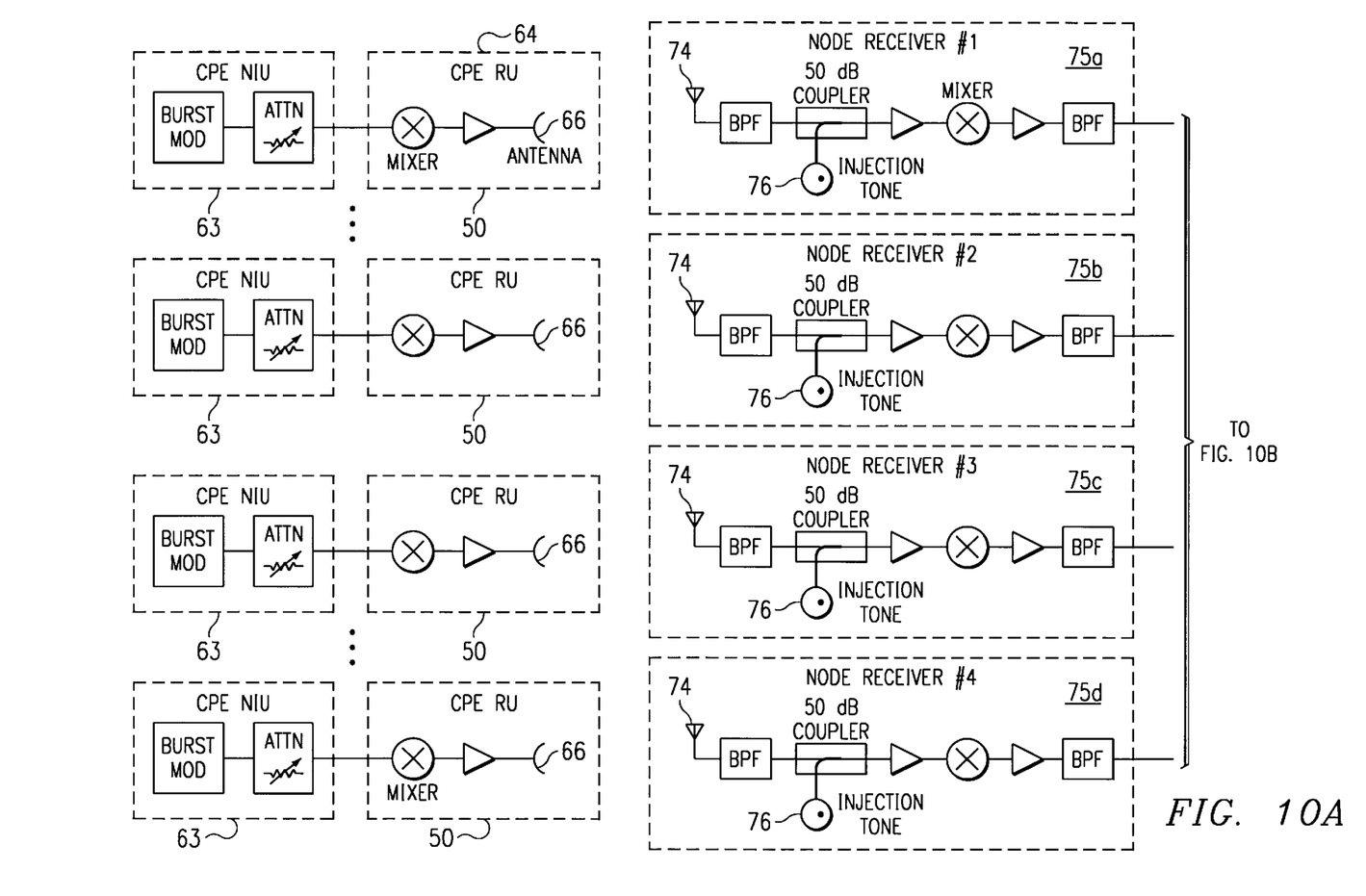
FIG. 10 is a low cost power control system block diagram according to one embodiment of the present invention. []
Figure 10B:
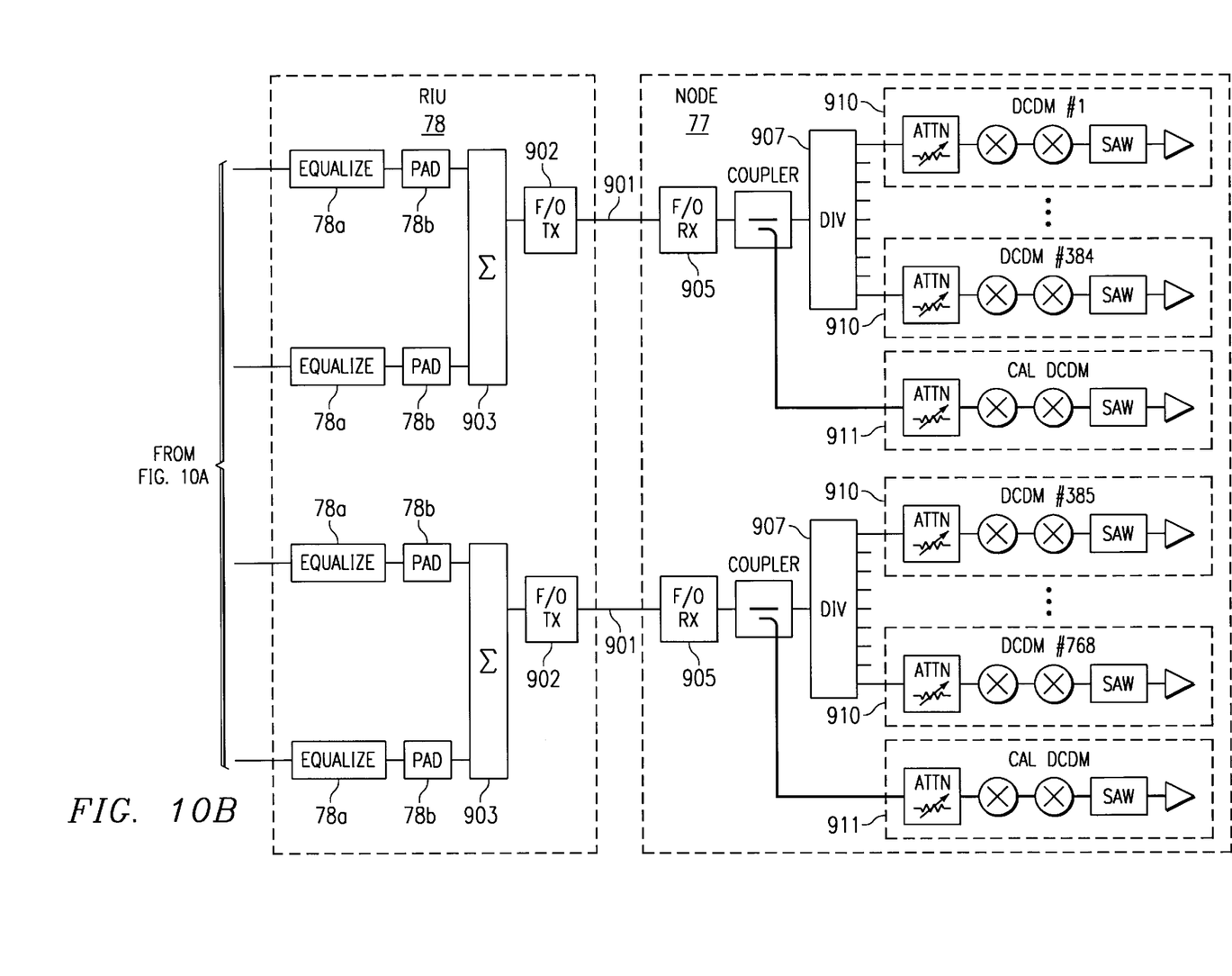

A block diagram of the upstream multipoint system is shown in more detail in FIG. 10. It shows a four sector node (4 node receivers 75*a*–75*d*) with many subscribers 50 per sector. Base equipment 77 is also shown at the far right connected to the node by fiber optic lines 901. For continuous mode operation the maximum number of subscribers per sector can be 192 for the symmetric international frequency plan. For burst mode installations, the maximum number of subscribers per sector climbs to over 6000. The system shown in FIG. 10 also strives to minimize the number of fibers used for the reverse link by combining two sectors on each fiber. The actual number of sectors combined on a single fiber can vary depending on the frequency plan and also on the node receiver sub-sector ideas. The actual combining of sectors on the fiber takes place in the node Radio Interface Unit (RIU) 78 at summer 903. The RIU is not shown in FIG. 1, but is included in 23 and 75. The Base equipment in FIG. 10 shows the fiber optic receivers 905, a large divider network 907(two 384 way dividers), followed by a large number of Base Down Converter and Demodulator Assemblies(DCDM), one for each reverse link RF carrier.

Overall, power control must control the transmitted power of each subscriber 50 in a continuous manner to maintain all of the links. One subscriber transmitting too much power can disturb up to 5 other subscribers around the Node, the two subscribers at adjacent frequencies in the same sector, and the subscribers at the same frequency in the other sectors around the Node.

It has been determined that the optimum place for the power control sub-system to balance all subscribers is at the input on the Node receivers. All subscribers around a Node must be balanced to equal power levels at the input to the Node receiver regardless of how many Node receiver sectors or sub-sectors.

Many methods of power control have been considered; however, a closed loop approach appears to be the most accurate and reduces or eliminates many errors that contribute to power control inaccuracies.

In simplest form, a closed loop power control sub-system requires the following elements. The first element, some method of reading each reverse link RF carriers RSSI (Received Signal Strength Indicator) is required. The second element, a CPU somewhere in the system must determine if the subscribers transmitted power is adequate, within a window. The third element is a communication path from the Base equipment 11 to each subscriber 13(50) over which a message protocol is defined to assist in power control adjustments.

In order for power control to maintain equal power levels from all subscribers to the Node receivers, the power control sub-system,/must account for variations in path length, account for atmospheric conditions, and account for hardware equipment variations and installation variabilities. All of these add to the dynamic range requirements of the power control loop. All of the contributors have been accounted for in Table 2. The magnitude of the dynamic range requirements is on the order of 70 to 80 dB with ¾ of the contributors being a fixed attenuation at installation, roughly ¼ will vary over the lifetime of the link. The low cost approach to power control will place requirements on subscriber equipment and installers to remove a large portion of the "fixed dynamic range" at installation.

This would leave the power control dynamic range requirements that include the variable over the lifetime plus a tolerance associated with the installation.

TABLE 2

CPE Transmit Power (FIG. 1, item 66) Dynamic Range Requirements

| Source of Error | Magnitude | Fixed at Install | Variable Over Lifetime | Notes |
|---|---|---|---|---|
| NIU to RU cabling | 9 dB | 9 dB | | 2 to 11 dB |
| NIU gain variations unit to unit | 4 dB | 4 dB | | +/− 2 dB |
| CPE RU gain variation | 4 dB | | 4 dB | spec at +/− 2dB |
| CPE antenna gain variation unit to unit | 4 dB | 4 dB | | 34 dB to 38 dB |
| Near/Far | 34 dB | 34 dB | | 20 log (5/.1) |
| Rain Margin | 16 dB | | 16 dB | |
| Node (RX) antenna gain variations across FOV (FIG. 1, item 74) | 6 dB | 6 dB | | 4 to 6 dB |
| Node (RX) antenna gain variations unit to unit (FIG. 1, item 74) | 2 dB | 2 dB Antenna | | Based on Horn |
| Total | 79 dB | 59 dB | 20 dB | |

At the node equipment, any variation in frequency will add to the power control errors. In addition, all receive sector must be amplitude balanced at the fiber optic transmitter 902. The low cost approach to power control will require equalization of the receive pass band and level matching of all receivers to point at installation. The equalization function will remove any slope in the node receiver (RX) 75 cable 901, or RIU 78. The Receiver matching will perform the amplitude matching for all Node receivers. The optimum time to perform the equalization and matching functions is at installation to remove any cabling errors. Both of these functions are highlighted in the block diagram in FIG. 10. It is expected that a 28 GHz source 76 and spectrum analyzer 31 (shown in FIG. 1) will be available at node installation to measure the pass band response of the receiver. Various gain equalizers 78a and pads 78b will be available for the equalization and balancing function.

The node receivers 75 require a simple calibration that performs the following functions: establish a reference for power control—all reverse link carriers will be set to this level and remove gain uncertainly in the receiver chain due to variations from temperature, component, as other effects.

The RF calibration tone can be best implemented by a single injection tone from source 76 at 28 GHz coupled into the Node receivers directly after the antenna 74. This Receiver Calibration Tone must have a known absolute output power level which varies minimally with time or temperature. Any variation will add to error in estimating to RSL. As shown in FIG. 10, each node receiver 75a–75d also includes a band pass filter (input), a 50 dB coupler for the tone, a mixer between amplifiers and an output band pass filter.

The base equipment contains a detector for measuring RSSI of the code tone. In one implementation a dedicated one of the Down Converter Demodulators (DCDM) 910, CAL DCDM 911, is used as a calibration DCDM 911 for power control. As a minimum, one calibration DCDM 911 per fiber optic line is required. The signals for the calibration DCDM 911 shall be coupled off after the fiber optic receivers 905. The calibration DCDM 911 performs RSSI measurements on the Receiver Calibration Tone to establish the reference for power control. First this measurement will remove any absolute gain variation in the entire receiver chain. The receivers have already been equalized and balanced. This calibration tone measurement allows the gain from the node receiver antenna 74 to the demodulator 910 to be calculated. Given a gain estimate, G, and an RSSI, then a RSL is estimated by $R\hat{S}L = RSSI/\hat{G}$. As an alternative to a single frequency calibration tone described above, a tunable calibration tone 76 allows individual channel gains to be estimated. RSSI measurements can be performed on both the calibration DCDM 911 and the each of the reverse link DCDMs. Since they are tuned to the same frequency, the difference in RSSI measurements yields a delta gain difference that is used as a calibration offset factor used in the power control algorithm.

The original concept (multiple calibration DCDMs) can be simplified by realizing that only one calibration DCDM 911 is necessary.

The power control sub-system balances all reverse link RF carriers to a target RSL at the input of the node receivers 75. Therefore estimating the Received Signal Level (RSL) is of prime importance. The Base equipment cannot measure the RSL of each carrier accurately without knowing the gain from the node receiver 75 to the demodulator 910. If a reference (calibration tone) is supplied, the RSL can be calculated from the calibration terms and the RSSI measurements. The equations for power control can best be described below.

In simplest form assuming no errors terms the equations (all terms in dB) for RSL are as follows:

1. RSL Calculations for Cal Tone:

$$RSL_{CAL-OSC} = RSSI_{CAL-DCDM@CAL-FREQ} - G_{RX} \quad (1b)$$

where: $RSL_{CAL-OSC}$ and $RSSI_{CAL-DCDM@CAL-FREQ}$ are known and $G_{RX}$ is unknown re-written as:

$$G_{RX} = RSSI_{CAL-DCDM@CAL-FREQ} - RSL_{CAL-OSC} \quad (1b)$$

2. RSL Calculation for each Reverse Link RF Carrier:

$$RSL_{FX} = RSSI_{DCDM@FX} - G_{RX} + \Delta G \quad (2a)$$

Where: $\Delta G$ is the difference in RSSI measurements between the CAL DCDM and the dedicated DCDM.

$$\Delta G = RSSI_{CAL-DCDM@FX} - RSSI_{DCDM@FX}$$

Simplified To:

$$RSL_{FX} = RSSI_{CAL-DCDM@FX} - G_{RX} \quad (2b)$$

From equation 2b it can be seen that the calculation of RSL for any reverse link RF carrier is a function of the RSSI measurement made by the CAL DCDM 911 and the gain of the receiver made by the CAL DCDM 911 on the Receive Calibration Tone. This forms the basis for the new method for power control. In simplest form, one CAL DCDM 911 could perform all of the power control calculations for all reverse link RF carriers if the time line permitted.

This update rate along with current Base protocol configurations may impose a larger number of CAL DCDMs 911 used in the system.

The current estimates for subscriber 13 update rate to account for rain fade are around 1 dB per 5 seconds per subscriber.

Current DCDM 910 tuning speed is specified at 12 $\mu$sec. The CAL DCDM 911 could perform RSSI measurements of approximately 76 continuous mode subscribers per second (1000 µsec/13 µsec per tune, perform RSSI measurement, calc window). For burst mode, the DCDM 910 performs RSSI measurements for each time slots in the duration of the time slot (each time slot is 116 µsec). Currently, the DCDM 910 can perform RSSI measurements for each time slot or approximately 1584 burst mode subscribers (1000 µsec/15 µsec per tune, perform 24 RSSI measurements, 24 calc windows).

The tuning speed of the DCDM 910 could be increased quite a bit without effecting performance or cost on the DCDM. Increasing the tuning speed of CAL DCDM 110 to 3 µsec would increase capacity to approximately 250 continuous mode subscribers per second (1000 µsec/4 µsec per tune, perform RSSI measurement, calc window) or approximately 2664 burst mode subscribers (1000 µsec/9 µsec per tune, perform 24 RSSI measurements, 24 calc windows).

It is clear that one calibration DCDM per sector is sufficient the handle power control in continuous mode, two calibration DCDMs per sector in burst mode. This method will require receiver (RX) rack CPU to receiver (RX) rack CPU communications. Another alternative is to let the BASE CPU handle the rack to rack communications.

Message protocol from base 11 to subscriber station 13 is currently handled at the receiver (RX) rack CPU. The receive (RX) rack CPU (not shown) will handle communications for a selected number of subscribers 13. Each downstream link is a DS3 rate (24 T1 s). Each receive rack handles the 24 reverse link RF carriers for the downstream DS3. Therefore, the receive (RX) rack CPU handles communications to all 24 continuous mode subscribers or 576 burst mode subscribers.

It is proposed that the calibration DCDM 911 perform the RSSI measurement and the windowing function to determine if the current RSSI reading is within the power control window. If the calibration DCDM 911 determines that the measured RSSI is within the power control window, the no power control action is required of the subscriber. If the current RSSI reading is outside of the power control window, then a message will be sent to adjust the subscriber'ss transmitter power higher or lower.

In addition, the current DCDM 910 performs both the RSSI function and the demodulator function. These functions could be split apart for cost savings. The calibration DCDM 911 requires only the RSSI functionality while the dedicated DCDMs only require the demodulation functionality. Since there may be as many as 768 dedicated DCDMs per node, there may be substantial cost savings realized here.

It has been proposed in the past to modify the software in the DCDM 911 to incorporate a few difference messages to aid in buss timing. These messages are: (1) add a short one slot RSSI message, and (2) add a dump all slot RSSI values.

There are several ways for message protocol from Base 11 to subscribers 13 as described below.

One way is to send a command message over a Command and Control Channel (CCC) only when power control adjustment is required. This method provides for a constant interrogation rate with a variable subscriber update rate. The variable subscriber update rate offers timeline relief by implementing less buss traffic to the subscriber.

Another approach is to send the RSSI reading for each subscriber across the CCC to each subscriber. The subscriber would be responsible for the calculations and adjustments required for transmitted power. This approach provides for a constant interrogation rate with a constant subscriber update rate. This method distributes the processing loading for power control to all subscribers but tends to maximize buss traffic. Decisions could be implemented to only send RSSI values to subscribers when there is a change. This logic is similar to the power control logic itself and would duplicate functionality.

Another approach for the message protocol is a broadcast message. The calibration DCDM 911 shall maintain a table of action required by each subscriber 50. Two (2) bits would be reserved for each subscriber (for continuous mode this would be 24 subscribers times 2 Bits, for burst mode this would be 576 subscribers times 2 bits). This would form a broadcast message to all subscribers 13 on this DS3 link. The Receive Rack CPU would query the calibration DCDM 911 for the table entry for the particular DS3 and send this broadcast message across the Command and Control Channel. The two bits could be interpret as follows:

00—no power control action required
01—increase transmitted power by 1 dB
10—decrease transmitted power by 1 dB
11—undefined or available for other use The undefined bit could be used to step the CPE in a fine or coarse step size if this proves to be necessary for power control. This method provides for a constant interrogation rate with a semi-constant subscriber update rate, semi-constant because only 2 bits are transmitted to each subscriber. This method removes the processing from the (RX) rack CPU to the calibration DCDM which only function is power control.

Although the present invention and its advantages have been described in detail, it should be understood that various changes, substitutions and alterations can be made herein without departing from the spirit and scope of the invention as defined by the appended claims.

What is claimed is:

1. A point-to-multipoint communications system comprising:
   a base station providing point-to-multipoint service to subscribers in a given area;
   said base station including one or more base station transmitters;
   a power control system coupled to said base station for controlling downstream power;
   said power control system including an off-the-air monitor and pickup antenna located in said given area a given distance from said base station for detecting power transmitted by said one or more base station transmitters and a control signal generator coupled to said monitor to provide power control signals to said one or more base station transmitters for controlling the power from said base station transmitters.

2. The system of claim 1 wherein said monitor senses the composite power level and said control signal sets the power level of the output from said base station.

3. The system of claim 2 wherein said monitor senses the power of any individual channel and said generator provides a gain control signal proportional to the sensed power level for each channel to control the transmitter power corresponding to that sensed at each channel.

4. The system of claim 1 wherein said base station transmitter includes one or more AGC loops.

* * * * *